United States Patent [19]

Vater et al.

[11] Patent Number: 4,533,149
[45] Date of Patent: Aug. 6, 1985

[54] SPLIT SEAL RING WITH INTERLOCKING CUT

[75] Inventors: George R. Vater, Clarendon Hills; Aldo Allori, Brookfield, both of Ill.

[73] Assignee: J. I. Case Company, Racine, Wis.

[21] Appl. No.: 501,557

[22] Filed: Jun. 10, 1983

Related U.S. Application Data

[63] Continuation of Ser. No. 272,148, Jun. 10, 1981, abandoned.

[51] Int. Cl.³ .................................................. F16J 9/14
[52] U.S. Cl. .................................................. 277/221
[58] Field of Search ........................ 277/221, 220, 222

[56] References Cited

U.S. PATENT DOCUMENTS

| 1,271,077 | 7/1918 | Probasco | 277/221 |
| 2,485,862 | 10/1949 | Caza | 277/221 |
| 4,189,161 | 2/1980 | Grimm | 277/221 |

FOREIGN PATENT DOCUMENTS 324406  1/1930  United Kingdom .............. 277/221

Primary Examiner—Robert I. Smith
Attorney, Agent, or Firm—Dressler, Goldsmith, Shore, Sutker & Milnamow, Ltd.

[57] ABSTRACT

A seal ring for controlling fluid flow is provided with an interlocking cut allowing the seal ring to be latched into a continuous ring after being opened to allow positioning in an accompanying annular groove.

2 Claims, 8 Drawing Figures

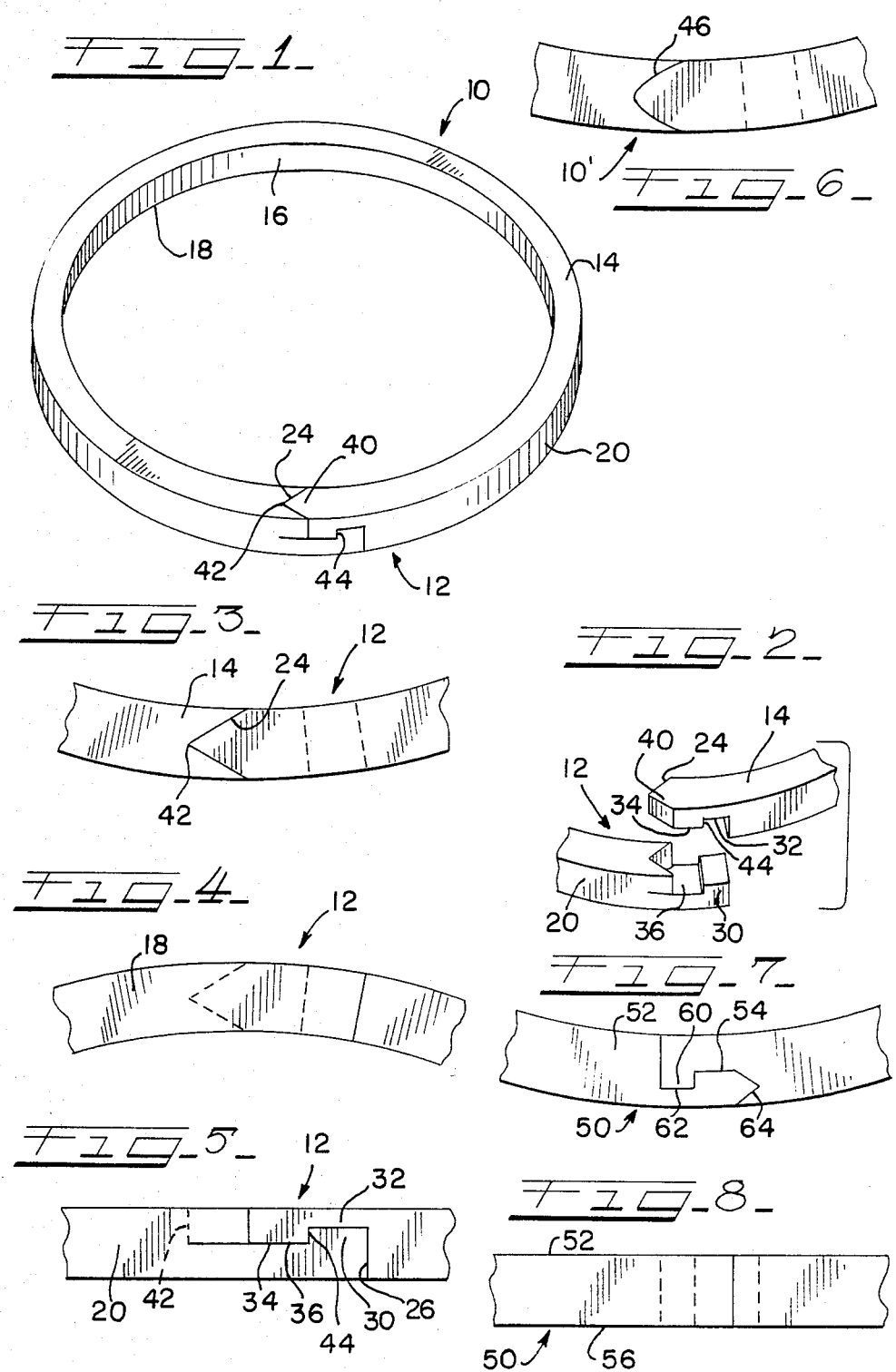

SPLIT SEAL RING WITH INTERLOCKING CUT

This is a continuation application of the prior application Ser. No. 272,148 filed on June 10, 1981 and abandoned on May 25, 1983.

This invention is concerned with annular seal rings for use in controlling fluid passage between a stationary and a moving surface. More specifically a seal ring is provided that can be made discontinuous for installation and fastened into a continuous ring upon desired placement.

Seal rings are widely used in sealing applications where fluid containment is a desirable aim. Seal rings of various non-metallic materials such as polytetraflouroethylene (PTFE) as well as elastomeric materials have been developed and widely used as seals where annular groove equipped shafts are supported in adjacent housings. In order to position these seal rings into the annular grooves it has been found necessary to split the ring using a step cut junction to allow the ring to be expanded over the surface having the annular groove. The step cut rings have the disadvantage that when they are spread and reassembled the adjoining ends of the rings may not retain their original close relationship thus resulting in a seal ring that has a larger diameter than desired.

A second type of seal ring is an expansion type where the ring is cut in a specific way leaving a flexible membrane that does not sever the continuity of the ring but does allow temporary diameter changes during installation. The disadvantage of these seal rings are that the ring cannot be opened more than a nominal amount without damage to the flexible membrane.

The seal ring in accordance with this invention is a PTFE seal ring having an interlocking cut that allows the seal ring to be latched into a continuous seal ring after being opened to allow positioning in an accompanying annular groove.

The seal ring is provided with a top surface having a transverse non-radial die cut that extends toward a bottom surface of the seal ring. The bottom surface is also provided with a transverse cut that extends toward the top surface of the seal ring but is spaced away from the top surface die cut. Both an internal surface and an external surface are die cut with a cut that extends to the opposite side of the ring. The internal to external surface cut incorporates an interlocking stepped male and female coupling that will hold the seal ring together when subjected to force exerted longitudinally, tangentally to, or aligned with the general circumference of the seal ring.

A first die cut, the transverse die cut, is made through the seal ring from the exterior surface to an interior surface. An interlocking tortuous cut prevents the annular seal ring from being transversely expanded after assembly thus keeping the adjacent ends of the split ring together.

The top surface transverse non-radial die cut comprises a cut extending from the internal to the external sidewall in a path starting at the internal sidewall and proceeding non-radially toward the exterior sidewall for a distance less than the width of the top surface then changing directions and heading to a point that is radially outboard of the interior surface starting point to the exterior sidewall. This interlocking cut prevents the fastened ends of the seal ring from being displaced laterally from each other—that is—it prevents the seal ring from being unintentionally unfastened and taking a decreasing radius spiral shape.

In one embodiment the seal ring is made of filled PTFE and has an outside diameter of 64 mm, a depth of 4.5 mm and a thickness of 3.0 mm. The locking cut or fastener portion of the seal ring is about 4 mm in circumferential length with the top cut, steps and bottom cut sized to provide a secure interlocking fastening system.

It is one of the objects of this invention to provide a seal ring with an interlocking cut that resists uncoupling from transverse and longitudinal directions.

It is also an object of this invention to provide an interlocking fastening system for a ring seal that will be closeable after being inserted into its host annular groove.

These and other objects and advantages of the invention will be more apparent through an understanding of the following drawings and descriptions in which:

FIG. 1 is a perspective view of a sealing ring incorporating the interlocking fastening system;

FIG. 2 shows a portion of the seal ring interlocking fastening system in an unfastened mode;

FIG. 3 shows a portion of a seal ring top surface;

FIG. 4 shows a portion of a seal ring bottom surface;

FIG. 5 shows a portion of a seal ring exterior sidewall surface;

FIG. 6 presents an alternative embodiment of the invention shown in FIG. 1;

FIG. 7 shows an alternative embodiment of an interlocking seal; and

FIG. 8 is an elevation view of the seal shown in FIG. 7.

Referring to the drawings, wherein reference characters in each figure represent the same element, there is shown in FIG. 1 a seal ring generally 10 incorporating an interlocking snap-on fastening system generally 12. The seal ring 10 is a ring having a rectangular body defined by a top surface 14, an interior surface 16, a bottom surface 18 and an exterior surface 20.

The interlocking and essentially clearance-free fastening system 12 is formed through the process of making a series of die cuts into a preformed PTFE (or other alternative seal ring material) seal ring that is a continuous band.

The first die cut is made from the outside surface of the seal ring toward the inside surface. It is a single cut made with a die having a shape shown as a transverse die cut 26 in FIG. 5 by the solid line. This transverse die cut 26 forms interlocking male or tongue and female or groove elements 30 and 32, the interior flat base 34 and the interior floor 36 of the radially interlocking wedge portion 40. The transverse die cut 26 extends forward under the radially interlocking portion 40 to the reversal point, such as 42, of the top surface transverse die cut 24.

The second die cut is a top surface transverse die cut 24 that is formed by a cutting die being forced through the top surface of the seal ring and into the interior of the seal ring for a predetermined depth. This second die cut is a non-radial die cut extending from an inboard intersection of the interior surface and the top surface to a reversal point 42 and then reversing its direction and extending in an opposite or angular with direction from the reversal point to an outboard intersection of the exterior surface and the top surface. The depth of the second die cut is uniform for the length of the cut and extends from the top surface to the first die cut. The figures show that this depth may be approximately one half to two/thirds the depth of the seal ring thickness. In a preferred embodiment the second die cut would have a straight cut extending from the inboard intersection to the reversal point 42 and a straight cut extending from the reversal point 42 to the outboard intersection in an opposite direction, thereby forming a wedge 25.

The instant interlocking split seal ring can be easily opened when not installed in its working environment. However, when in place, for instance in an annular groove machined into a rotatable shaft carried in a housing, and when the seal has to functionally operate to contain fluid within the housing, the seal ring will be locked in place by a single snap-on movement and could not, theoretically, be dislodged without removal of the host shaft from the host housing. In a preferred embodiment the annular groove for containing the seal ring will be slightly wider than the thickness (top surface to bottom surface) of the seal ring. The transverse die cut short elevation cut 44 will be greater than the difference between the thickness of the seal ring and the host annular groove thus preventing the seal ring from axial displacement of a degree sufficient to cause interlocking male and female elements 30 and 32 from becoming disengaged.

FIG. 6 presents an alternative embodiment of an interlocking split seal ring. In this embodiment the seal ring is similar to the ring shown in FIGS. 1-5 with the difference being the modification of the shape of the top surface transverse die cut 24. In this alternative embodiment the alternative top surface transverse die cut 46 is more curvilinear than the preferred embodiment. Other aspects such as the die cutting method and transverse die cut 26 remain the same as the embodiment shown in FIGS. 1-5.

An alternative version of an interlocking split ring seal fastening system is shown generally as 50 in FIGS. 7 and 8. In this embodiment the top surface 52 of the seal ring is provided with a tortuous die cut 54 that extends from the top surface 52 all the way to the bottom surface 56. The tortuos die cut begins at the interior surface of the seal ring and extends to the exterior surface of the ring. One version of the tortuous path die cut is shown in FIG. 7. In this embodiment only a single die cut is made as a transverse die cut such as 26 of FIG. 5 is not necessary.

A male element 60 interlocks with female element 62 when the seal ring generally 50 is in a fastened mode. This locking relationship prevents the longitudinal separation of the seal ring ends. The alternative radially interlocking wedge portion 64, shown here by intersecting planes, merges into the male and female portions through the continuation of the die cut, i.e. both locks with corresponding matching parts are disposed in a series. Portion 64 is provided to prevent radial displacement of the seal ends in the same manner as the radial interlocking portion 40 of the FIG. 2 embodiment. Said wedge projection 40 aligned with the ring longitudinal axis and a rectangular tongue-and-groove lock having a tongue 60 or 32 extending transversely to the ring longitudinal axis.

Thus it can be seen that there is provided a split annular ring seal having an interlocking cut that fully satisfies the objects of this invention. The inventors' contemplate several nuances of design that would be slightly different from the embodiments shown but would include the advantages and objects of this invention. For instance it would not be necessary to make the intersections between planes in the side die cuts as square as they are shown—the intersections could be more smoothly contoured for a less abrupt transition. These and other design nuances as fall within the spirit and scope of the appended claims are contemplated by the inventors.

What is claimed is:

1. A split annular ring seal having a rectangular cross-sectional shape defined by spaced apart interior and exterior surfaces connecting top and bottom surfaces of said ring seal, the improvement comprising an interlocking fastening system connecting adjacent ends of said split annular ring seal by providing a detachable locking arrangement thereof in both radial and longitudinal directions including an interfitting wedge lock preventing radial displacement of said seal ends and a tongue and groove lock preventing longitudinal uncoupling thereof, each of said wedge and tongue and groove locks extends inwardly from one of said top and bottom surfaces and are circumferentially spaced from each other.

2. A split annular ring in accordance with claim 1 in which said wedge lock is comprised of a V-shaped first end section having a lesser thickness than that of said ring and fitting into a V-shaped slot defined by the other end of said ring, which slot has a depth equal to the thickness of said first end portion, whereby the adjacent top and bottom surfaces of said ring seal are flush with each other.

* * * * *